(12) United States Patent
Kim et al.

(10) Patent No.: US 11,217,812 B2
(45) Date of Patent: Jan. 4, 2022

(54) CELL TAPING APPARATUS AND METHOD

(71) Applicant: LG Chem, Ltd., Seoul (KR)

(72) Inventors: Hye Jin Kim, Daejeon (KR); Sung Hoon Bae, Daejeon (KR); Dae Sik Chung, Daejeon (KR)

(73) Assignee: LG Chem, Ltd.

( * ) Notice: Subject to any disclaimer, the term of this patent is extended or adjusted under 35 U.S.C. 154(b) by 156 days.

(21) Appl. No.: 16/672,907

(22) Filed: Nov. 4, 2019

(65) Prior Publication Data

US 2020/0144650 A1 May 7, 2020

(30) Foreign Application Priority Data

Nov. 6, 2018 (KR) .................. 10-2018-0135170

(51) Int. Cl.
*H01M 8/2404* (2016.01)
*H01M 50/209* (2021.01)
*H01M 10/04* (2006.01)

(52) U.S. Cl.
CPC ..... *H01M 8/2404* (2016.02); *H01M 10/0404* (2013.01); *H01M 10/0468* (2013.01); *H01M 50/209* (2021.01)

(58) Field of Classification Search
CPC .......... H01M 50/209; H01M 10/0404; H01M 10/0468
USPC .................................. 29/623.4, 730
See application file for complete search history.

(56) References Cited

FOREIGN PATENT DOCUMENTS

KR       20150049768 A      5/2015
WO    WO-2015065082 A1 *   5/2015   .............. H01M 6/46

* cited by examiner

*Primary Examiner* — Sean P Cullen
(74) *Attorney, Agent, or Firm* — Lerner, David, Littenberg, Krumholz & Mentlik, LLP

(57) ABSTRACT

A cell taping apparatus includes a plate provided with an accommodation space, into which a plurality of unit cells are configured to be stacked and accommodated, on a top surface thereof; a guide which extends upward from the top surface of the plate to define the accommodation space therein and through which at least one pair of first slots are defined to pass downward from an upper end of the guide at opposing left and right sides of the guide that face each other; and a tape, which has a length equal to or greater than a width of the plate, of which opposing ends respectively pass through a pair of the at least one pair of first slots, and which is seated on the top surface of the plate so that an adhesion surface of the tape faces away from the top surface of the plate.

18 Claims, 15 Drawing Sheets

A-A'

B-B'

CELL TAPING APPARATUS AND METHOD

CROSS-REFERENCE TO RELATED APPLICATION

The present application claims the benefit of the priority of Korean Patent Application No. 10-2018-0135170, filed on Nov. 6, 2018, which is hereby incorporated by reference in its entirety.

TECHNICAL FIELD

The present invention relates to a cell taping apparatus and method, and more particularly, to a cell taping apparatus and method, in which a taping operation for a plurality of stacked unit cells is capable of being completed at one time without being repeatedly performed several times.

BACKGROUND ART

In general, in order to manufacture a secondary battery, an electrode assembly is accommodated in a battery case, and an electrolyte is injected, and then, the battery case is sealed. Also, the electrode assembly is manufactured by using unit cells stacked in a three-layered structure or a five-layered structure in a state in which a separator is disposed between a positive electrode and a negative electrode. Such an electrode assembly may be classified into a jelly-roll type, in which a separator is disposed between a positive electrode and a negative electrode, and the positive electrode, the separator, and the negative electrode are wound, and a stack type in which a plurality of positive electrodes and negative electrodes, each of which has a predetermined size, are sequentially stacked with separators therebetween.

Each of the unit cells can be a bi-cell or a mono-cell. In the bi-cell, the two outermost electrodes have the same polarity. For example, when the unit cell has a structure that is stacked in order of positive electrode/separator/negative electrode/separator/positive electrode or negative electrode/separator/positive electrode/separator/negative electrode, the unit cell refers to a bi-cell because the two outermost electrodes have the same polarity. Particularly, the bi-cell in which the two outermost electrodes are positive electrodes refers to a A-type bi-cell, and the bi-cell in which the two outermost electrodes are negative electrode refers to a C-type bi-cell. On the other hand, in the mono-cell, the two outermost electrodes have different polarities. For example, when the unit cell has a structure that is stacked in order of positive electrode/separator/negative electrode/separator, the unit cell refers to the mono-cell because the two outermost electrodes have different polarities.

In order to manufacture the stack type electrode assembly, first, the plurality of unit cells is stacked, and then, the plurality of stacked unit cells have to be attached by using a tape.

FIG. 1 is a perspective view illustrating a state in which an upper jig 21 and a lower jig 22 of a cell taping apparatus 2 are applied to a plurality of unit cells 3 according to the related art.

As illustrated in FIG. 1, the cell taping apparatus 2 according to the related art includes the upper jig 21 and the lower jig 22.

Each of the upper jig 21 and the lower jig 22 has a flat plate shape that is formed so that a plurality of notches face each other. Also, two tab guides 221 are disposed on one side or both sides of the lower jig 22, and a space into which tabs are inserted is defined between the two tab guides 221. In order to tape the plurality of unit cells 3, the plurality of stacked unit cells 3 is seated on a top surface of the lower jig 22. Here, the tabs of the plurality of unit cells 3 are inserted into the space between the two tab guides 221. As a result, the plurality of unit cells 3 stacked by the tab guide 221 supporting the tabs of the plurality of unit cells 3 may be stably seated. Also, the upper jig 21 is disposed above the plurality of unit cells 3 to cover the plurality of unit cells 3.

FIG. 2 is a perspective view illustrating a state in which a first tape 41 is attached to the plurality of unit cells 3 by using the cell taping apparatus 2 according to the related art, FIG. 3 is a plan view of FIG. 2, and FIG. 4 is a cross-sectional view of the cell taping apparatus 2 of FIG. 3, taken along line A-A'.

As illustrated in FIG. 2, the first tape 41 is attached to the plurality of unit cells 3 exposed through both notches of each of the lower jig 22 and the upper jig 21. As a result, as illustrated in FIGS. 3 and 4, the first tape 41 is attached to some of both side surfaces and top and bottom surfaces of the plurality of unit cells 3.

FIG. 5 is a perspective view illustrating a state in which the cell taping apparatus 2 is removed from the plurality of unit cells 3 according to the related art, and FIG. 6 is a perspective view illustrating a state in which a second tape 42 is attached to the plurality of unit cells 3.

When the first tape 41 is attached to the plurality of unit cells 3, as illustrated in FIG. 5, the lower jig 22 and the upper jig 21 of the cell taping apparatus 2 are removed from the plurality of unit cells 3. Also, as illustrated in FIG. 6, the second tape 42 is attached to be wound around a circumference of the plurality of unit cells 3.

The first tape 41 is only for temporarily fixing the plurality of unit cells 3 so as to easily attach the second tape 42. Thus, it is necessary to perform a process of winding and attaching the second tape 42 one or more times along the circumference of the plurality of stacked unit cells 3. This is done because, if only the first tape 41 is attached to both sides of the plurality of unit cells 3, the first tape 41 may be detached later in an electrolyte injection process or a degassing process. Particularly, since a gas within the case has to be discharged to the outside in the degassing process, the first tape 41 may be more easily detached by a flow of the gas.

However, according to the related art, since the taping operation has to be performed two or more times, there is a problem in that a time and effort are excessively consumed. Also, since the user has to directly hold and wind the plurality of stacked unit cells 3 by using hands thereof so as to attach the second tape 42, a degree of alignment of the plurality of stacked unit cells 3 may be reduce, and the plurality of unit cells 3 may be contaminated or damaged.

PRIOR ART DOCUMENT

[Patent Document]
Korean Patent Publication No. 2015-0049768.

DISCLOSURE OF THE INVENTION

Technical Problem

An object of the present invention is to provide a cell taping apparatus and method, in which a taping operation for a plurality of stacked unit cells is capable of being completed at one time without being repeatedly performed several times.

The objects of the present invention are not limited to the aforementioned object, but other objects not described herein will be clearly understood by those skilled in the art from descriptions below.

Technical Solution

To achieve the above object, a cell taping apparatus according to an embodiment of the present invention includes: a plate provided with an accommodation space, into which a plurality of unit cells are configured to be stacked and accommodated, on a top surface thereof; a guide which extends upward from the top surface of the plate to define the accommodation space therein and through which at least one pair of first slots are defined to pass downward from an upper end of the guide at opposing left and right sides of the guide that face each other; and a tape, which has a length equal to or greater than a width of the plate, of which opposing ends respectively pass through a pair of the at least one pair of first slots, and which is seated on the top surface of the plate so that an adhesion surface of the tape faces away from the top surface of the plate.

Also, the cell taping apparatus may further include a plurality of unit cells stacked on the adhesion surface of the tape.

Also, the plate may include a groove that is recessed inward at a position at which one of the ends of the tape is seated on the top surface of the plate.

Also, the cell taping apparatus may further include a holder that fixes the one of the ends of the tape to the groove when the one of the ends of the tape is inserted into the groove.

Also, the plate may include grooves that are recessed inward at positions at which both the ends of the tape, respectively, are seated on the top surface of the plate.

Also, the cell taping apparatus may further include holders that fix both the ends of the tape, respectively, to the respective groove when both the ends of the tape are inserted into the respective grooves.

Also, the at least one pair of first slots may include a plurality of pairs of first slots.

Also, the guide may further include a second slot that is defined to pass downward from the upper end of the guide at a position corresponding to that at which a tab is disposed on the plurality of unit cells.

Also, the second slot may be defined at a front or a rear side of the guide.

To achieve the above object, a cell taping method includes: a step of allowing opposing ends of a tape to respectively pass through a pair of at least one pair of first slots formed in a guide and allowing an adhesion surface of the tape to be seated on a top surface of the plate while facing away from the top surface of the plate; a step of stacking a plurality of unit cells on the adhesion surface of the tape to accommodate the plurality of unit cells in an accommodation space provided on the top surface of the plate; and a step of moving both the ends of the tape to an upper side of the stack of unit cells so as to adhere to each other.

Also, the plate may include a groove that is recessed inward at a position at which one of the ends of the tape is seated on the top surface of the plate, and the cell taping method may further include, after the tape is seated on the top surface of the plate, a step of inserting one of the ends of the tape into the groove; and a step of allowing a holder to fix the one of the ends of the tape to the groove.

Also, in the step of moving the both the ends of the tape to adhere to each other, the tape may adheres also to side and top surfaces of the stack of unit cells.

To achieve the above object, a cell taping apparatus according to an embodiment of the present invention includes: a plate provided with an accommodation space, into which a plurality of unit cells are configured to be stacked and accommodated, on a top surface thereof; a guide which extends upward from the top surface of the plate to define the accommodation space therein and through which at least one pair of first slots are defined to pass downward from an upper end of the guide at opposing left and right sides of the guide that face each other.

Also, the plate may include a groove that is recessed inward at a position aligned with one of the slots of the at least one pair of first slots on the top surface of the plate.

Also, the cell taping apparatus may further include a holder configured to fix one end of a tape to the groove when the one end of the tape is inserted into the groove.

Also, the at least one pair of first slots may include a plurality of pairs of first slots.

Also, the guide may further include a second slot that is defined to pass downward from the upper end of the guide at a position corresponding to that at which a tab is disposed on the plurality of unit cells.

Also, the second slot may be defined at a front or a rear side of the guide.

Particularities of other embodiments are included in the detailed description and drawings.

Advantageous Effects

The embodiments of the present invention may have at least the following effects.

The tape is previously seated on the top surface of the plate, and then, the plurality of unit cells may be stacked. Therefore, the taping operation for the plurality of stacked unit cells may be completed at one time without repeating the taping operation several times.

The effects of the prevent invention are not limited by the aforementioned description, and thus, more varied effects are involved in this specification.

MODE FOR CARRYING OUT THE INVENTION

Figure 1:
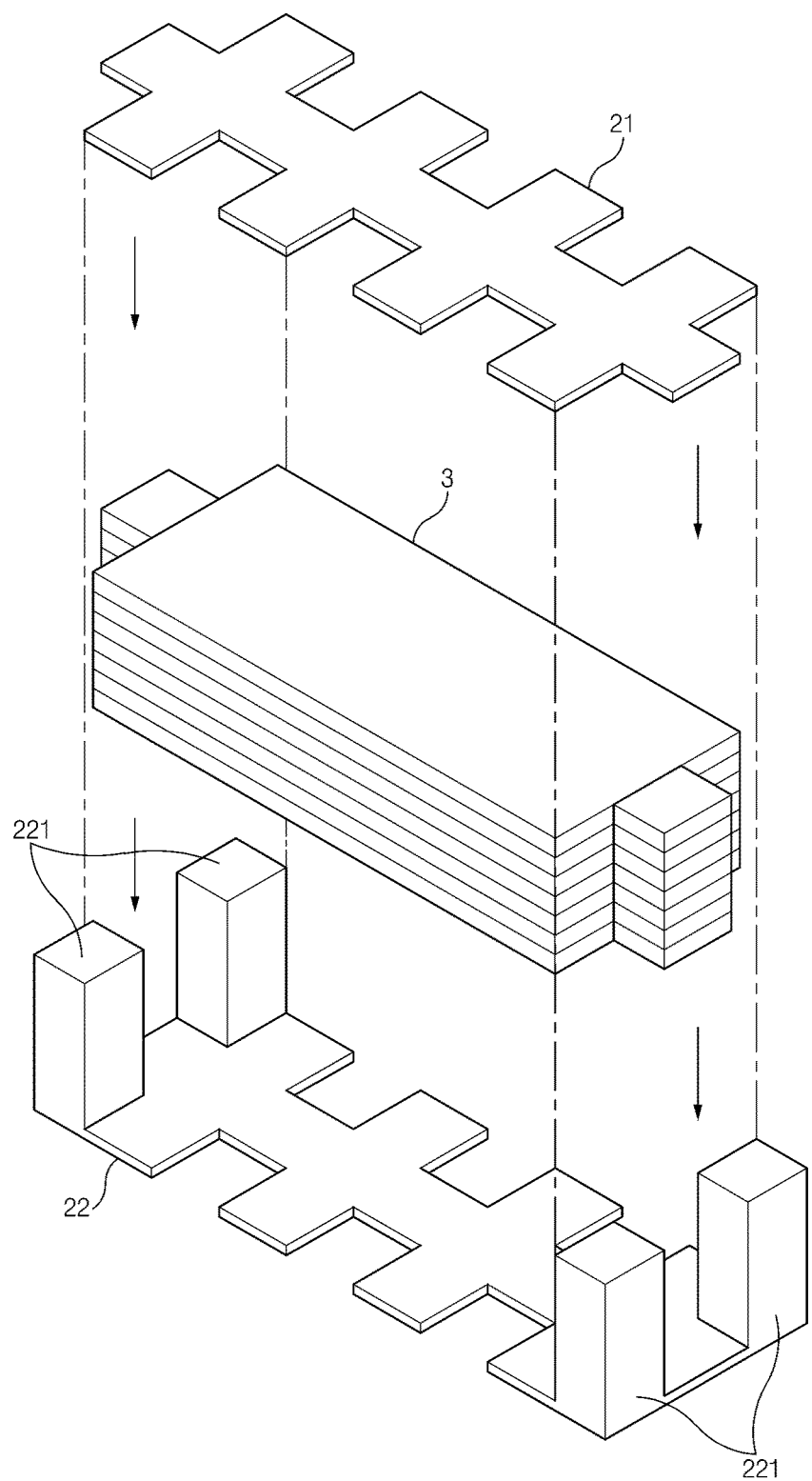
FIG. 1 is a perspective view illustrating a state in which an upper jig and a lower jig of a cell taping apparatus are applied to a plurality of unit cells according to a related art.
Figure 2:
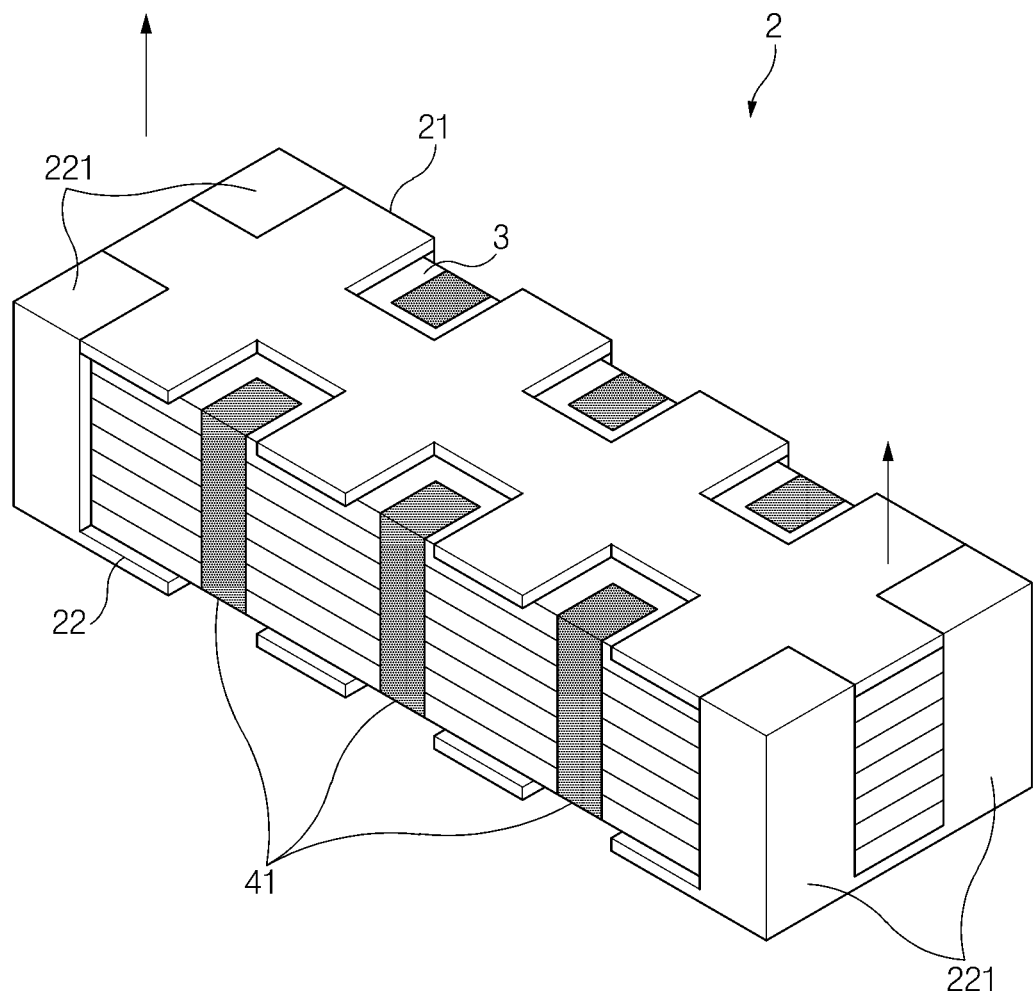
FIG. 2 is a perspective view illustrating a state in which a first tape is attached to the plurality of unit cells by using the cell taping apparatus according to the related art.
Figure 3:
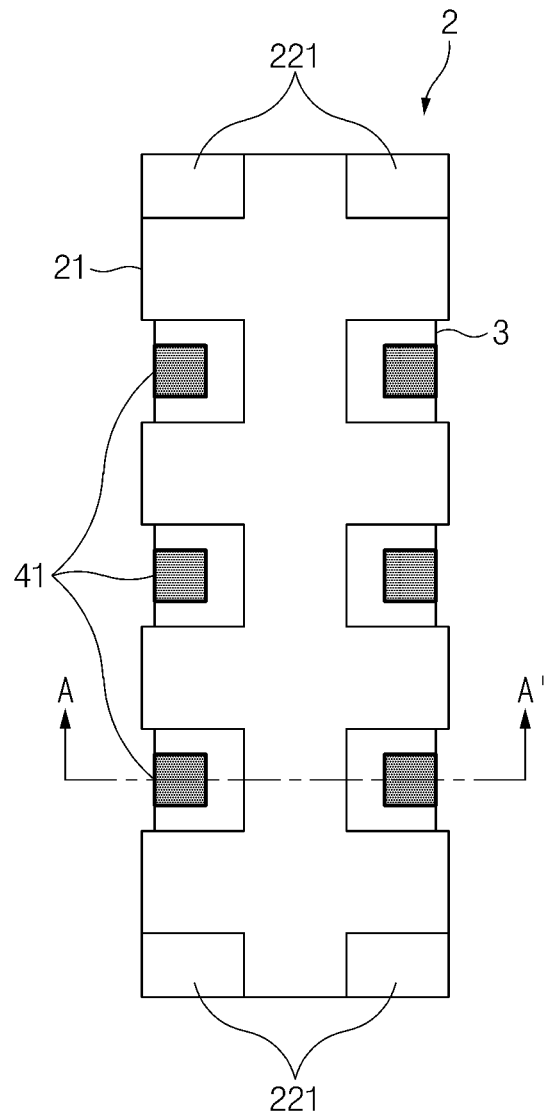
FIG. 3 is a plan view of FIG. 2.
Figure 4:
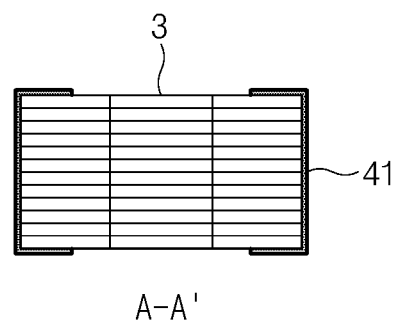
FIG. 4 is a cross-sectional view of the cell taping apparatus of FIG. 3, taken along line A-A'.
Figure 5:
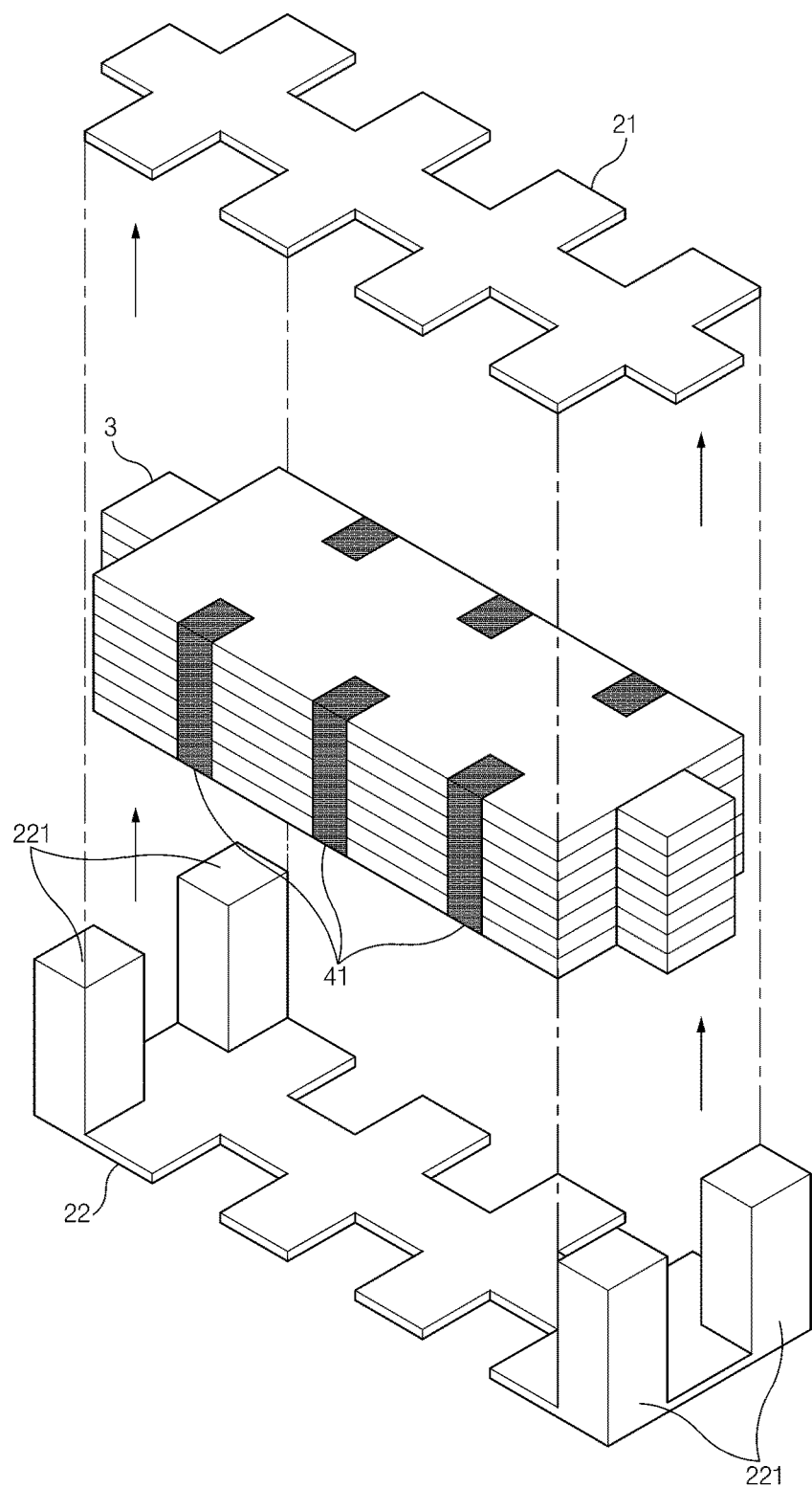
FIG. 5 is a perspective view illustrating a state in which the cell taping apparatus is removed from the plurality of unit cells according to the related art.
Figure 6:
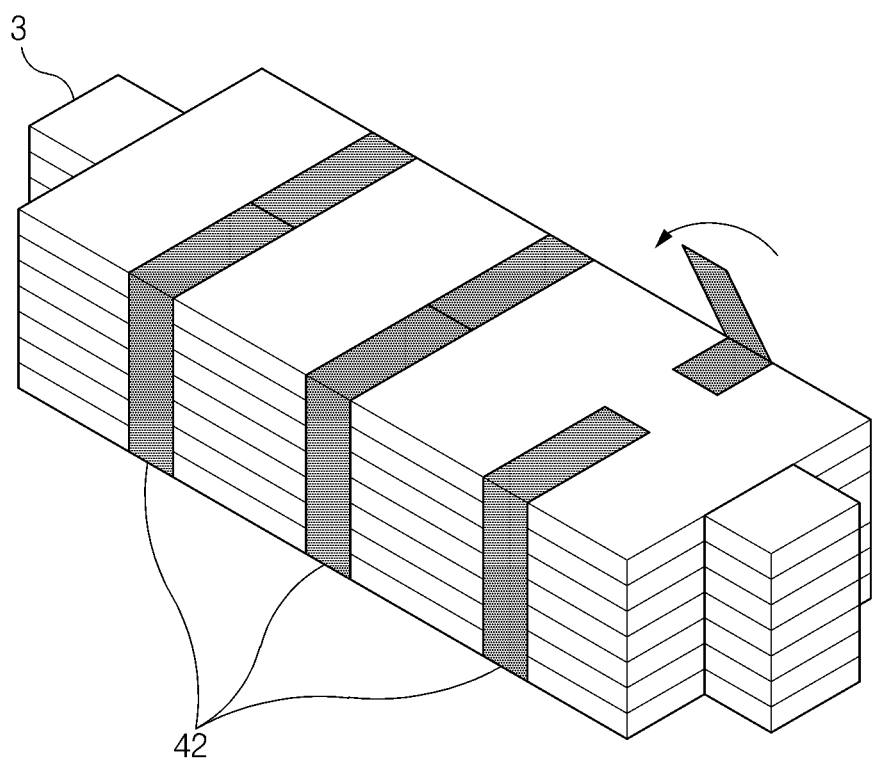
FIG. 6 is a perspective view illustrating a state in which a second tape is attached to the plurality of unit cells.

Advantages and features of the present disclosure, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may comprise plural forms unless specifically mentioned. The meaning of "comprises" and/or "comprising" does not exclude other components besides a mentioned component.

Hereinafter, preferred embodiments will be described in detail with reference to the accompanying drawings.

Figure 7:
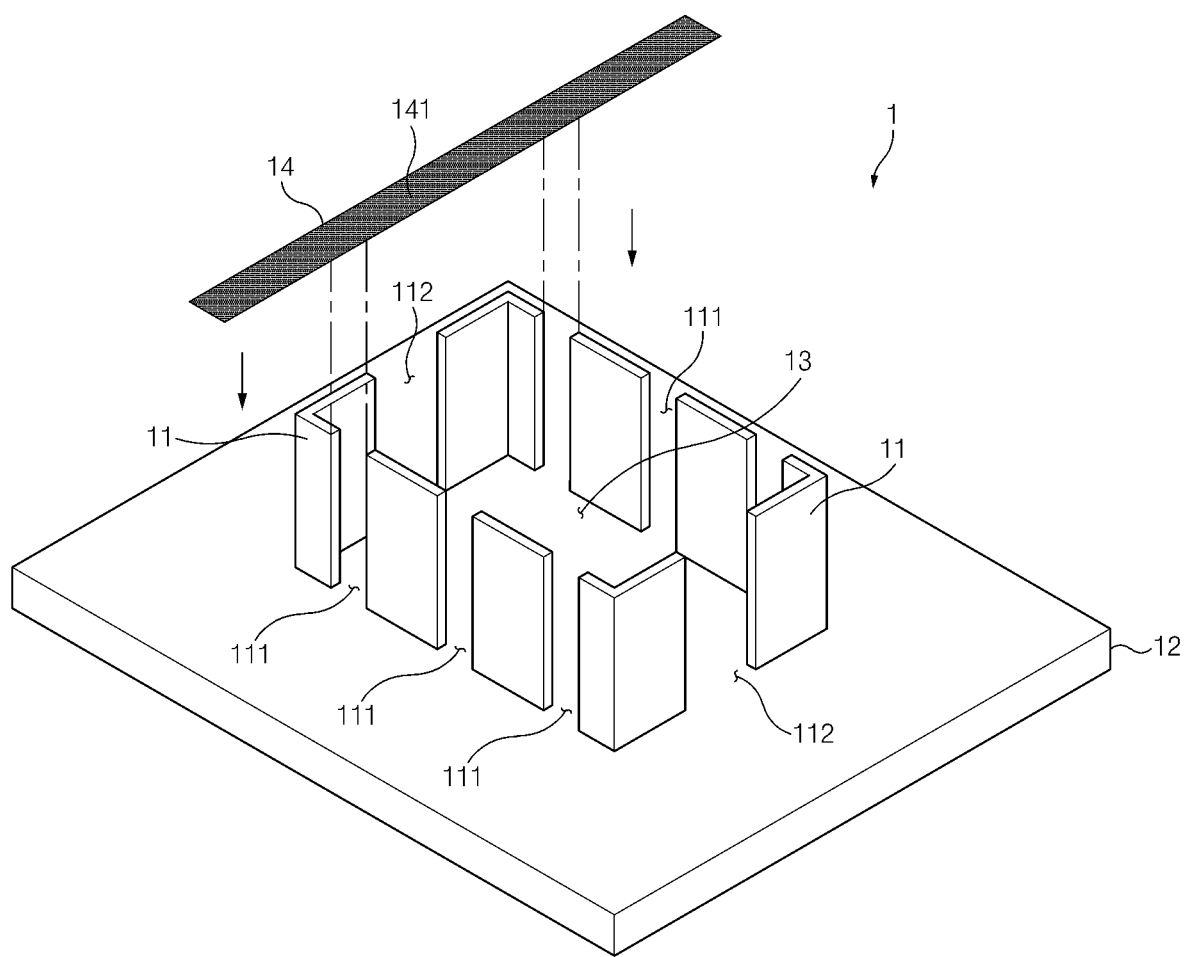
FIG. 7 is a perspective view of a cell taping apparatus according to an embodiment of the inventive concept.

FIG. 7 is a perspective view of a cell taping apparatus 1 according to an embodiment of the inventive concept.

The cell taping apparatus 1 according to an embodiment of the present invention includes a plate 12 having a top surface provided with an accommodation space 13 in which a plurality of unit cells 3 of a secondary battery are stacked and accommodated, a guide 11 which extends upward from the top surface of the plate 12 to define the accommodation space 13 therein and through which at least one pair of first slots 111 are lengthily defined to pass downward from an upper end of the guide at positions of both left and right sides, which face each other, respectively, and a tape 14, which has a length equal to or greater than a width of the plate, of which both ends respectively pass through the pair of first slots 111, and which is seated on the top surface of the plate so that an adhesion surface 141 faces away from the top surface of the plate.

The plate 12 has a wide plate shape, and the accommodation space 13 is defined on the top surface of the plate 12. Also, the plurality of unit cells 3 of the secondary battery are accommodated in the accommodation space 13. Each of the unit cells 3 can be a bi-cell or a mono-cell. Thus, only one of the bi-cell or the mono-cell may be stacked, or more than one of the bi-cell and the mono-cell may be stacked.

In order to maintain the alignment while the unit cells 3 are stacked, the accommodation space 13 may have a shape and size, which correspond to those of the unit cells 3. Here, the correspondence in shape may mean that the accommodation space 13 has equal or similar to that of the unit cell 3 so that the unit cell 3 is easily accommodated in the accommodation space. Also, the correspondence in size may mean that the accommodation space 13 has a size greater than that of the unit cell 3 by an offset value. If the accommodation space 13 has the same size as the unit cell 3, the unit cell 3 may not be inserted into the accommodation space 13 or may not freely fall by friction with the guide 11 surrounding the accommodation space even though the unit cell 3 is inserted. On the other hand, if the size of the accommodation space 13 is too large, the unit cell 3 may get out of a fixed position while falling down, and thus, the degree of alignment may be largely reduced. Therefore, it is preferable to have an appropriate offset value so that the degree of alignment is not significantly reduced while the unit cell 3 is easily inserted to freely fall by gravity. Actually, the offset value may be determined experimentally depending on a size and shape of the secondary battery to be manufactured.

The guide 11 may be disposed on the top surface of the plate 12 to lengthily extend in a direction in which the plurality of unit cells 3 is stacked, thereby defining the accommodation space 13. That is, the guide 11 may serve as an outer wall of the accommodation space 13 to embody the shape of the accommodation space 13. Also, when the plurality of unit cells 3 is stacked to form a stack of the unit cells 3, the guide 11 supports a circumference of the stack of the unit cells 3.

At least one pair of first slots 111 are lengthily defined to pass downward from an upper end of the guide 11 at positions of both left and right sides of the guide 11, which face each other, respectively. Since the tape 14 passes to be inserted into the first slot 111 later, the first slot 111 may have a width corresponding to that of the tape 14. Here, the correspondence in width may mean that the width is greater than that of the tape 14 by an offset value. If the first slot 111 has the same width as the tape 14, the tape 14 may not be inserted into the first slot 111 or may be bent even though the tape 14 is inserted. On the other hand, if the width of the first slot 111 is excessively larger than that of the tape 14, the tape 14 may get out of the fixed position and thus be attached to be inclined without being parallel to an edge of one side of the unit cell 3 later. Thus, it is preferable to have an appropriate offset value so that the tape 14 is attached in parallel to an edge of one side of the unit cell 3 later while the tape 14 is easily inserted without being bent. Actually, the offset value may be determined experimentally depending on the width of the tape 14 to be manufactured.

The first slot 111 has to be defined at each of positions of both the left and right sides of the guide 11, which face each other. If the slot is not defined at the positions facing each other, the inserted tape 14 may be attached to be inclined without being parallel to the edge of the one side of the unit cell 3 later.

The first slot 111 is defined to extend downward from an upper end of the guide 11. Accordingly, the tape 14 may be easily inserted and also be easily attached to side surfaces of the plurality of unit cells 3 which are inserted into the accommodation space 13 later. Also, since the first slot 111 is defined to pass through the guide 11, the guide 11 may be divided into a plurality of guides 11 as illustrated in FIG. 7. Each of the guides 11 may have a polygonal pillar shape and be fixed while defining the accommodation space 13 in the top surface of the plate 12.

Although only the pair of first slots 111 are provided, as illustrated in FIG. 7, a plurality of pairs of slots 111 may be provided. The tape 14 may be attached to the plurality of unit cells 3 by the number of pairs of first slots 111. That is, if one pair of first slots 111 are provided, one tape 14 may be attached to the plurality of unit cells 4. If three pairs of first slots 111 are provided, three tapes 14 may be attached to the plurality of unit cells 3.

The tape 14 has a length equal to or greater than a width of the plate 12 so that both ends of the tape 14 respectively pass through the pair of first slots 111, and the adhesion surface 141 is seated on the top surface of the plate 12 to face away from the top surface of the plate. Since the tape 14 has a length equal to or greater than the width of the plate 12, the user may easily hold both ends of the tape 14 later. Also, since both the ends of the tape 14 respectively pass through the first slots facing each other, the tape 14 may be parallel to the edges of one side of the plurality of unit cells 3.

The tape 14 is seated on the top surface of the plate 12 while the adhesion surface 141 faces away from the top surface of the plate. Here, the tape 14 is seated in the accommodation space 13 defined in the guide 11 on the top surface of the plate 12. Also, the plurality of unit cells 3 is stacked on the top surface of the tape 14 when the tape 14 is seated on the top surface of the plate 12. Thus, when the plurality of unit cells 3 is inserted into the accommodation space 13, the tape 14 may be attached to a bottom surface of the plurality of unit cells 3.

When the above-described cell taping apparatus 1 according to an embodiment of the present invention is used, the taping operation may be completed at one time without repeating the taping operation several times. A cell taping method using the cell taping apparatus 1 according to an embodiment of the present invention includes a step of allowing both ends of a tape 14 to respectively pass through at least one pair of first slots 111 formed in a guide 11 and allowing an adhesion surface 141 of the tape 14 to be seated on a top surface of the plate 12 while facing away from the top surface of the plate, a step of stacking a plurality of unit cells 3 of a secondary battery on a top surface of the tape 14 to accommodate the plurality of unit cells 3 in an accommodation space 13 provided in the top surface of the plate, and a step of allowing both the ends of the tape 14 to move to an upper side of the unit cells 3 so as to adhere to each other.

First, as illustrated in FIG. 7, both the ends of the tape 14 respectively pass through at least one pair of first slots 111 formed in the guide 11, and the adhesion surface 141 of the tape 14 is seated on the top surface of the plate 12 while facing away from the top surface of the plate.

Figure 8:
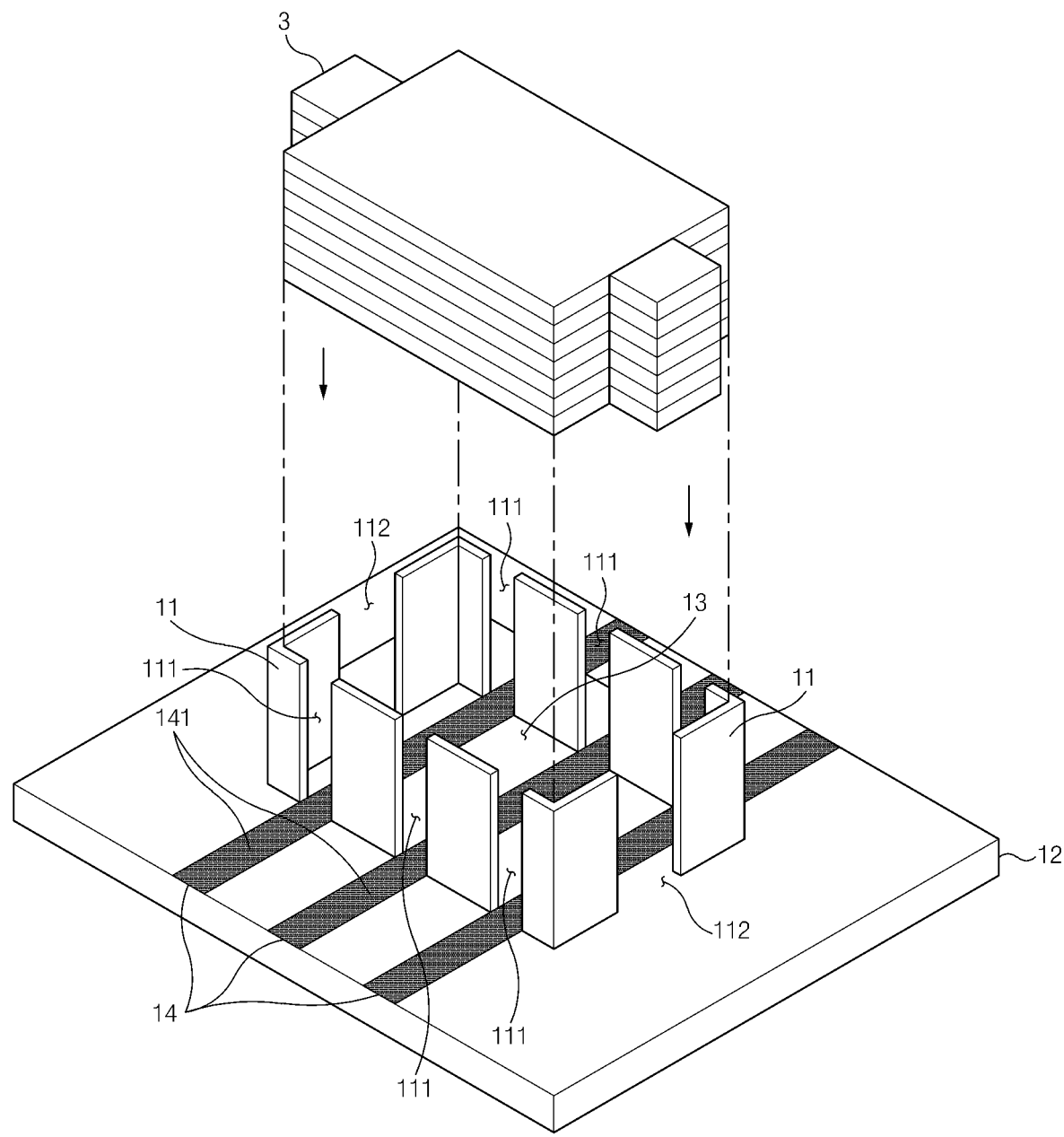
FIG. 8 is a perspective view illustrating a state in which a plurality of unit cells is inserted into the cell taping apparatus according to an embodiment of the present invention.

FIG. 8 is a perspective view illustrating a state in which a plurality of unit cells is inserted into the cell taping apparatus according to an embodiment of the present invention.

Subsequently, as illustrated in FIG. 8, the plurality of unit cells 3 of a secondary battery are stacked on a top surface of the tape 14 and accommodated in an accommodation space 13 provided in a top surface of a plate 12. Here, the plurality of unit cells 3 may be inserted and stacked one by one in the accommodation space 13, but if there is a separate stacking device, a stack itself of the unit cells 3 may be inserted into the accommodation space 13 after being stacked in the separate stacking device.

As described above, when the tape 14 is seated on the top surface of the plate 12, the adhesion surface 141 is seated to face away from the top surface of the plate. Also, the plurality of unit cells 3 is stacked on the top surface of the tape 14 when the tape 14 is seated on the top surface of the plate 12. Thus, when the plurality of unit cells 3 is inserted into the accommodation space 13, the tape 14 may be attached to a lower surface of the plurality of unit cells 3.

An electrode tab protrudes outward from one side of the plurality of unit cells 3. The electrode tab includes a positive electrode tab and a negative electrode tab, and the positive electrode tab and the negative electrode tab may protrude in the same direction, but may protrude in different directions. When the plurality of unit cells 3 is inserted into the accommodation space 13, in order to easily insert the electrode tab, the guide 11 is provided with a second slot 112 that is lengthily defined downward from an upper end of the guide 11 at a position corresponding to that at which the electrode tab is disposed on the unit cell 3. Thus, when the plurality of unit cells 3 is inserted into the accommodation space 13, the electrode tab may be easily inserted through the second slot 112.

Here, the electrode tab is disposed on a surface of the plurality of unit cells 3, to which the tape 14 is not attached. That is, if the tape 14 is wound from both sides of the plurality of unit cells 3 so as to be attached, the electrode tab is disposed at a front or rear side of the plurality of unit cells 3. Thus, unlike the first slot 111, the second slot 112 is not defined at both left and right sides of the guide 11, but preferably defined at the front or the rear sides of the guide 11.

Figure 9:
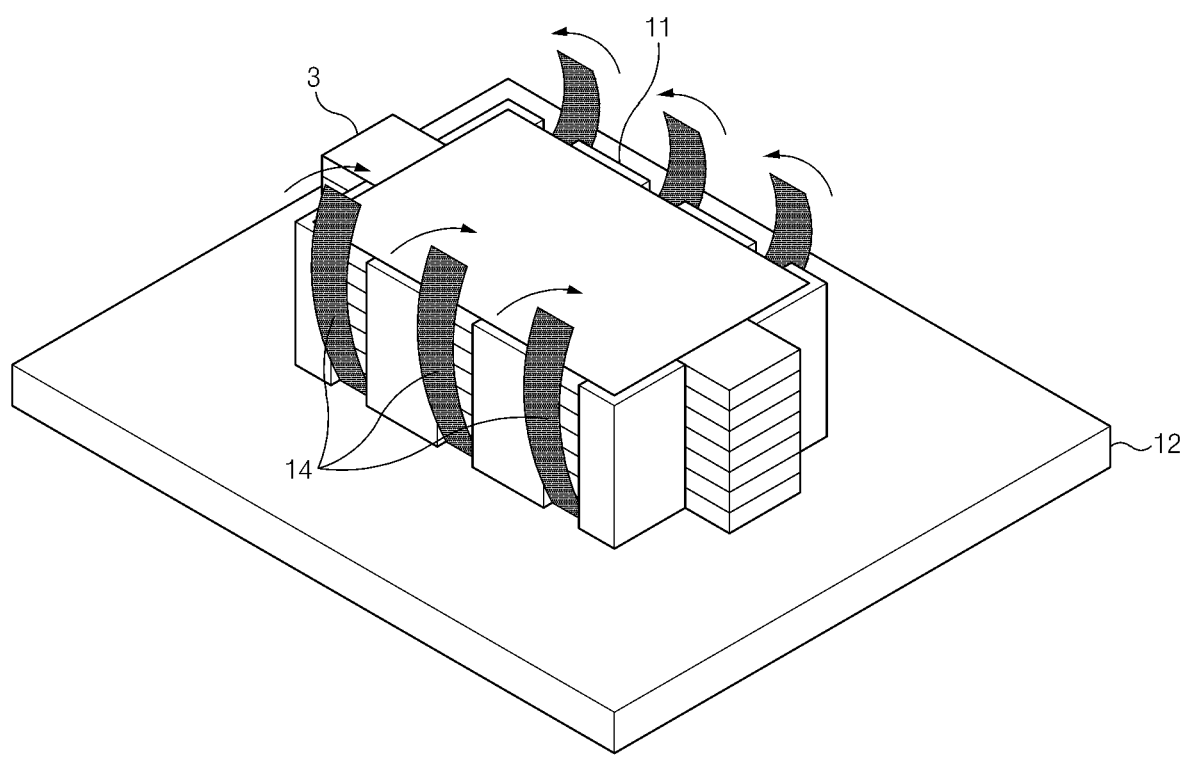
FIG. 9 is a perspective view illustrating a state in which a tape of the cell taping apparatus is attached to side surfaces of the plurality of unit cells according to an embodiment of the present invention.

FIG. 9 is a perspective view illustrating a state in which the tape 14 of the cell taping apparatus 1 is attached to the side surfaces of the plurality of unit cells according to an embodiment of the present invention.

When the plurality of unit cells 3 is inserted into the accommodation space 13, as illustrated in FIG. 9, both ends of the tape 14 respectively move to an upper side of the unit cells 3 to adhere to each other. Here, since the tape 14 has a length that is equal to or greater than a width of the plate 12, the user may easily hold both the ends of the tape 14 to move to the upper side of the plurality of unit cells 3.

Since the first slot 111 is lengthily defined to pass downward from the upper end of the guide 11, when the tape 14 moves upward, the tape 14 may naturally pass through the first slot 111 again, and the adhesion surface 141 of the tape 14 may be attached to the side surfaces of the plurality of unit cells 3. Here, it is preferable that a certain amount of tension is applied to the tape 14. As a result, when the tape 14 extends upward from a lower end of the plurality of unit cells 3, the tape 14 may have a straight-line shape without being bent, and thus, the tape 14 may be uniformly attached to the side surfaces of the plurality of unit cells 3.

Figure 10:
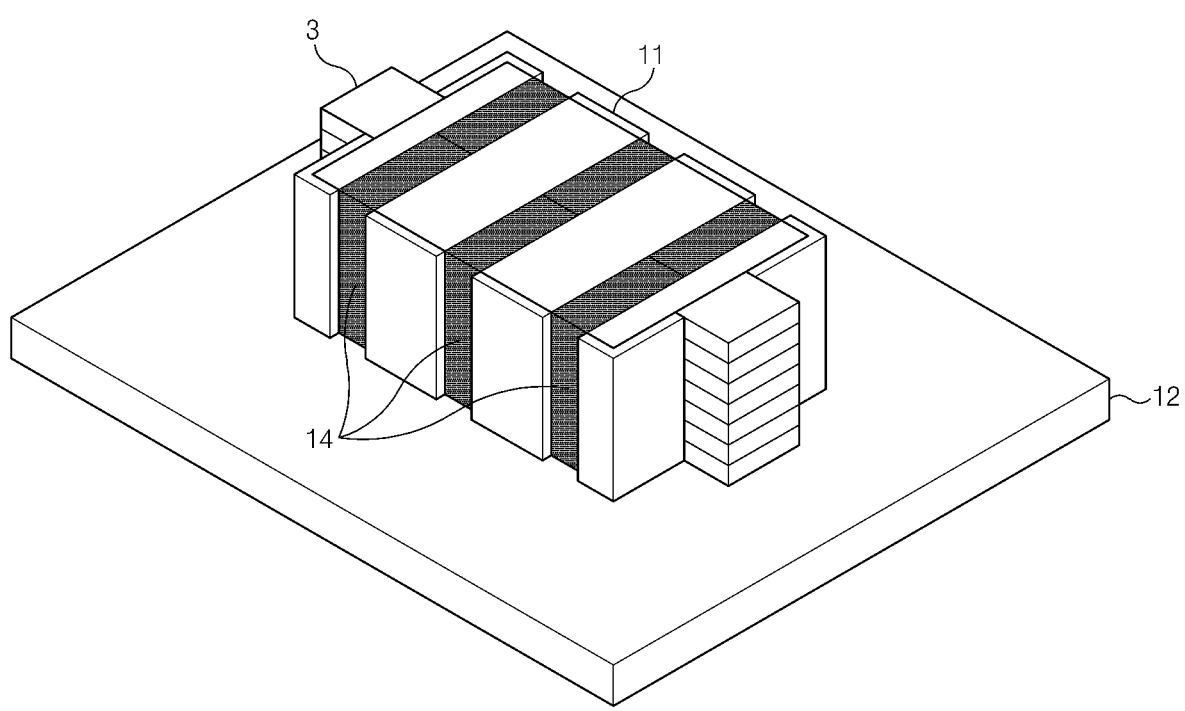
FIG. 10 is a perspective view illustrating a state in which the attachment of the tape is completed according to an embodiment of the present invention.
Figure 11:
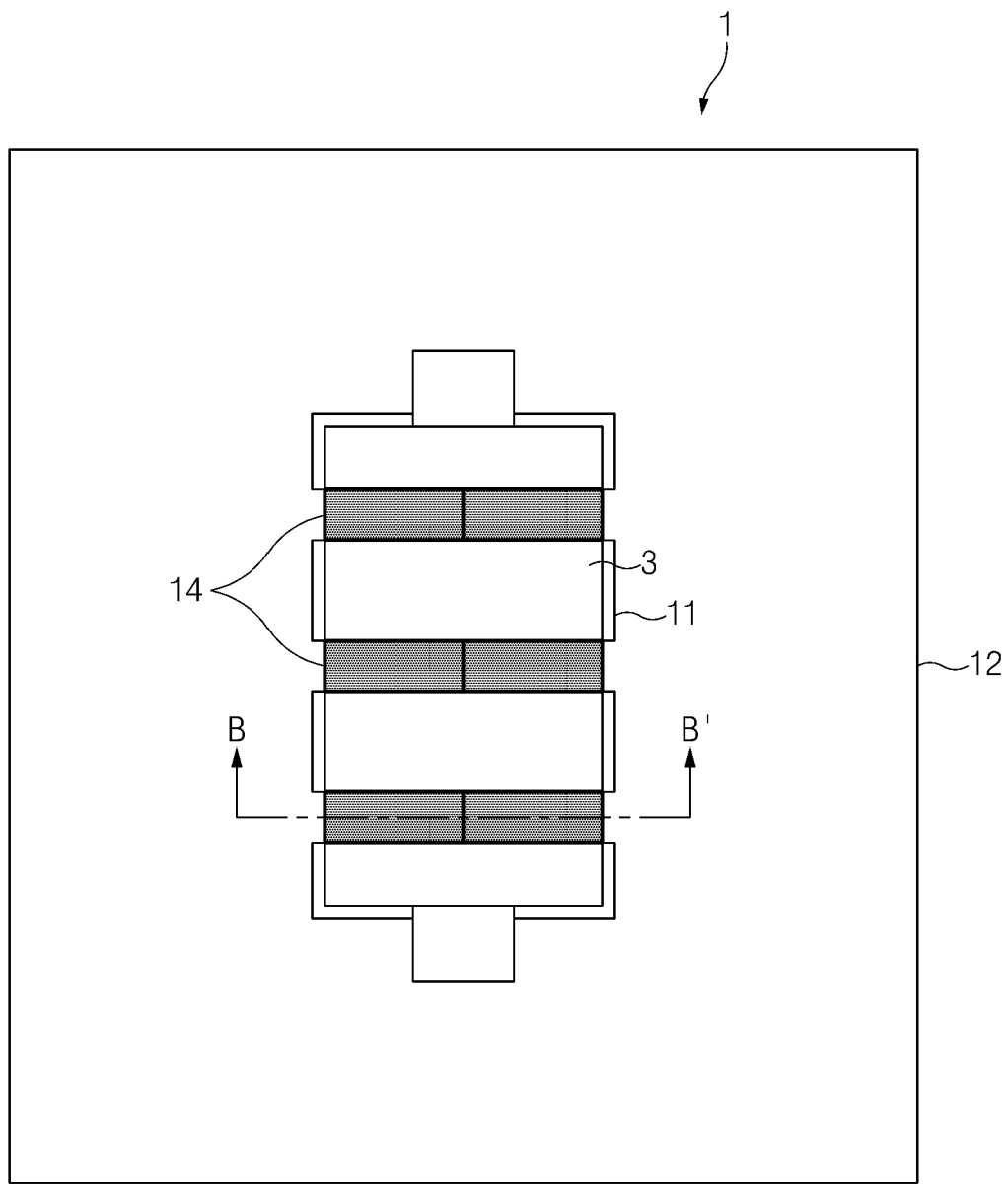
FIG. 11 is a plan view of FIG. 10.
Figure 12:
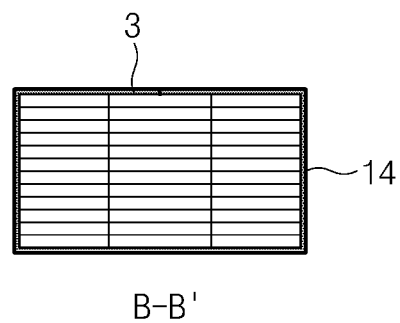
FIG. 12 is a cross-sectional view of the cell taping apparatus of FIG. 10, taken along line B-B'.

FIG. 10 is a perspective view illustrating a state in which the attachment of the tape is completed according to an embodiment of the present invention, FIG. 11 is a plan view of FIG. 10, and FIG. 12 is a cross-sectional view of the cell taping apparatus of FIG. 10, taken along line B-B'.

As described above, when the plurality of unit cells 3 is stacked, it is preferable that the tape 14 is wound around at least once and then attached. Otherwise, adhesion force at both the ends of the tape 14 attached in a degassing process or the like may be reduced, and thus, the tape 14 may be detached.

According to an embodiment of the present invention, both the ends of the tape 14 moving to the upper side of the plurality of unit cells 3 are attached to each other. Thus, as illustrated in FIG. 10, the tape 14 may be attached together not only on the side surfaces of the plurality of unit cells 3 but also on the top surface thereof. Here, as illustrated in FIGS. 11 and 12, the tape 14 is wound once around the periphery of the plurality of unit cells 3. That is, according to an embodiment of the present invention, the tape 14 may be wound at least once around the plurality of stacked unit cells 3 and then attached without repeating the taping operation several times.

Figure 13:
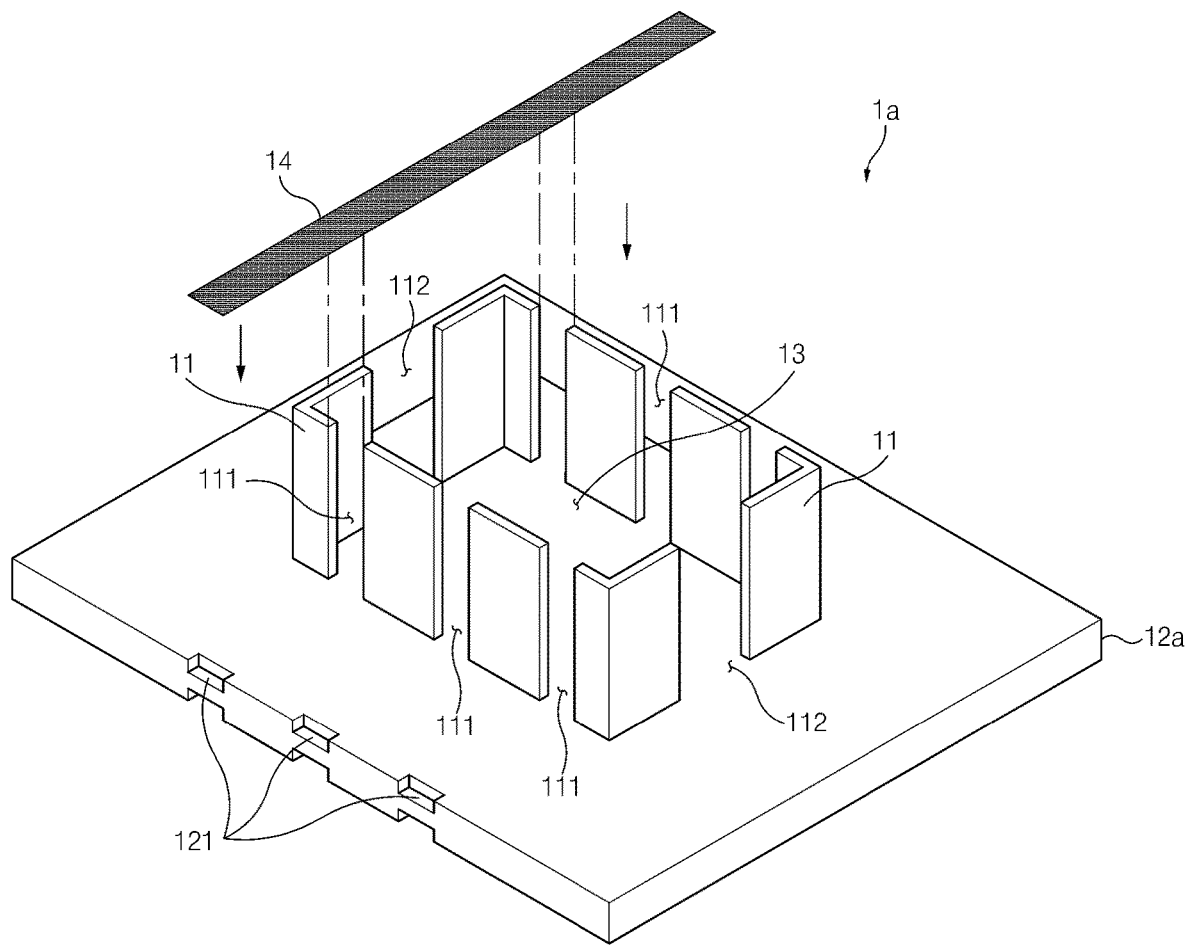
FIG. 13 is a perspective view of a cell taping apparatus according to another embodiment of the present invention.

FIG. 13 is a perspective view of a cell taping apparatus 1a according to another embodiment of the present invention.

According to an embodiment of the invention, the tape 14 is simply seated on the top surface of the plate 12. Here, if the tape 14 is wound around a separate reel and then unwound and seated on the top surface of the plate 12, it may be bent even after the tape 14 is seated on the top surface of the plate 12. Therefore, when the plurality of unit cells 3 is inserted into the insertion space, the tape 14 may be twisted so that a portion of the non-adhesion surface of the tape 14 contacts the plurality of unit cells 3, or the adhesion surface 141 may not uniformly adhere.

However, according to another embodiment of the present invention, as illustrated in FIG. 13, a plate 12a may include a groove 121 that is recessed inward at a position at which both ends of a tape 14 are seated on a top surface. When the tape 14 is seated on the top surface of the plate 12a, each of both the ends of the tape 14 may be naturally inserted into the groove 121.

Figure 14:
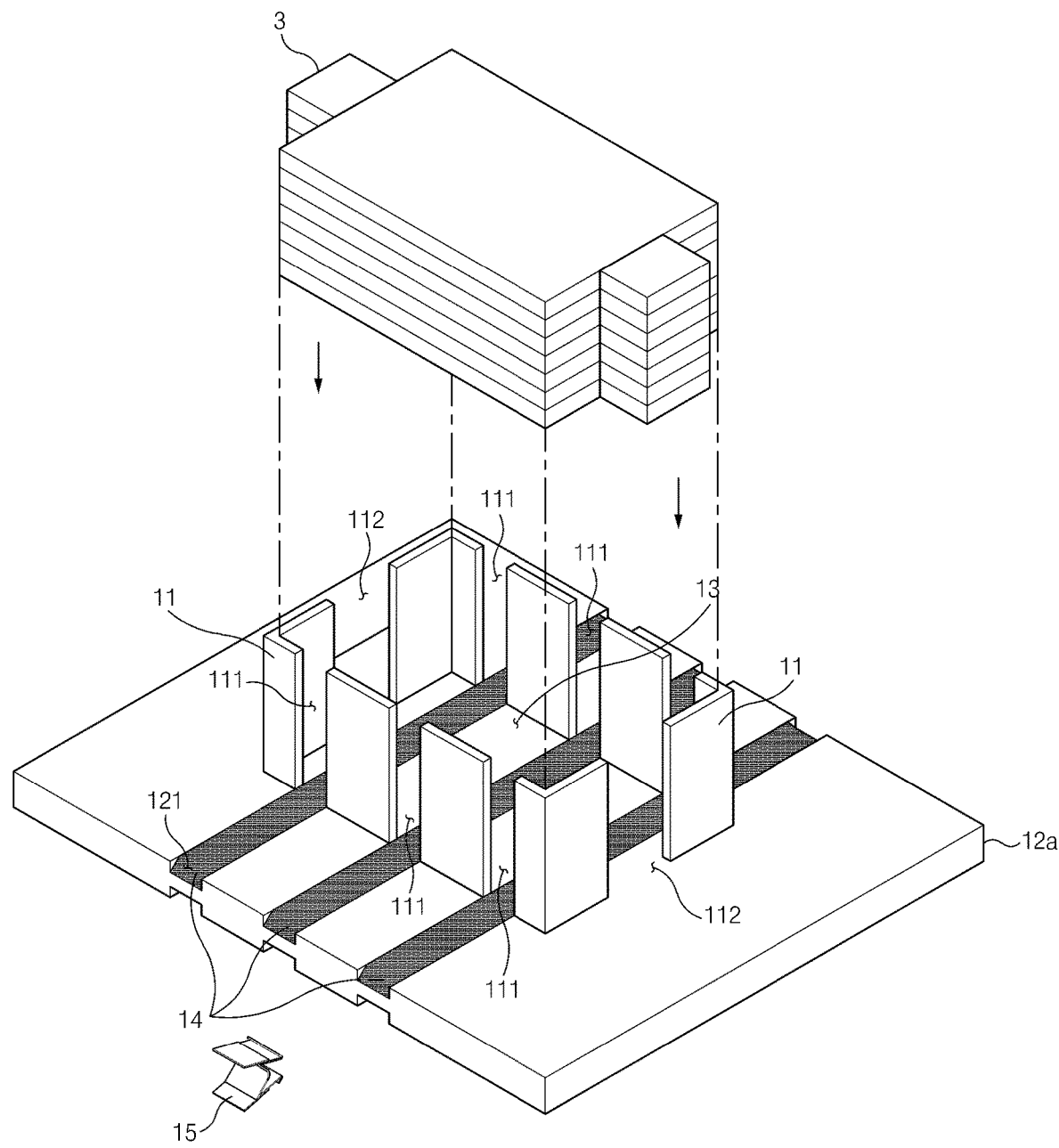
FIG. 14 is a perspective view illustrating a state in which a plurality of unit cells is inserted into the cell taping apparatus according to another embodiment of the present invention.

FIG. 14 is a perspective view illustrating a state in which the plurality of unit cells 3 is inserted into the cell taping apparatus 1a according to another embodiment of the present invention.

When each of both the ends of the tape 14 is inserted into the groove 121, the cell taping apparatus 1a according to another embodiment of the present invention further includes a holder 15 that fixes each of both the ends of the tape 14 to the groove 121. Thus, as illustrated in FIG. 14, when both ends of the tape 14 are respectively inserted into the grooves 121, the holder 15 fixes both ends of the tape 14 to the grooves 121. An example of the holder 15 may include tongs that are capable of gripping a specific object with elastic force by using two arms disposed at ends thereof. However, the present invention is not limited thereto, and if both the ends of the tape 14 are fixed to the groove 121, the holder 15 may be provided in various manners.

Figure 15:
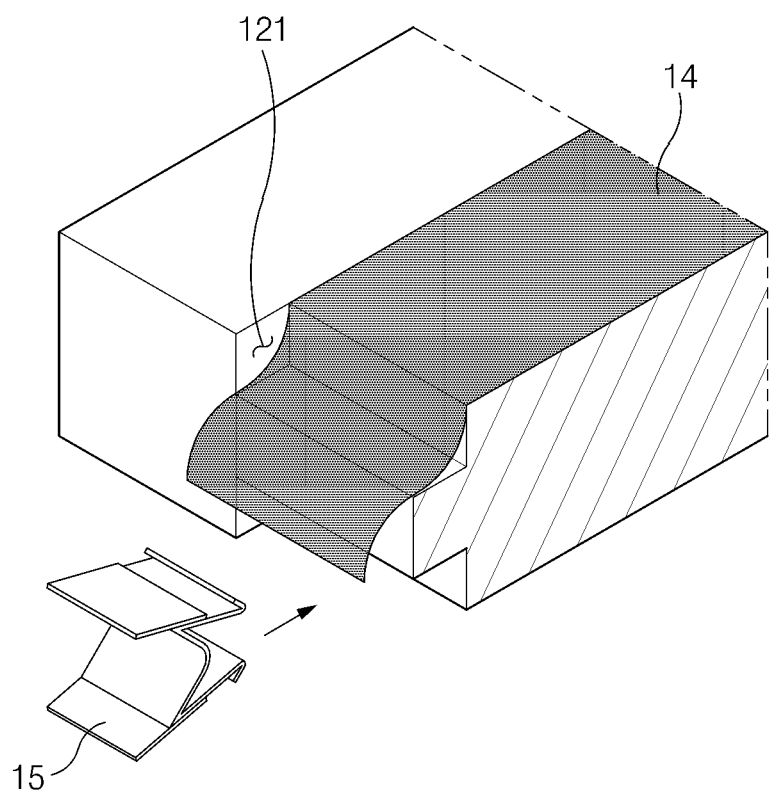
FIG. 15 is a schematic view illustrating a state in which a tape seated in a groove of the cell taping apparatus is fixed by a holder according to another embodiment of the present invention.

FIG. 15 is a schematic view illustrating a state in which a tape seated in the groove 121 of the cell taping apparatus is fixed by the holder 15 according to another embodiment of the present invention.

If the holder 15 is the tongs, each of both the ends of the tape 14 is inserted into the groove 121 defined in both side ends of the plate 12a as illustrated in FIG. 14. Also, the holder 15 fixes the tape 14 to the groove 121. As a result, the tape 14 may be seated on the plate 12a and then fixed. Therefore, the tape 14 may be prevented from being bent or twisted so that the tape 14 is uniformly attached to a lower surface of the plurality of unit cells 3.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A cell taping apparatus comprising:
   a plate provided with an accommodation space having a top surface;
   a guide which extends upward from the top surface of the plate in a fixed position with respect to the plate to define the accommodation space therein and through which at least one pair of first slots are defined to pass downward from an upper end of the guide at opposing left and right sides of the guide,
   wherein the plate comprises a groove that is recessed inward at a position aligned with one of the slots of the at least one pair of first slots on the top surface of the plate.

2. The cell taping apparatus of claim 1, wherein the at least one pair of first slots includes a plurality of pairs of first slots.

3. The cell taping apparatus of claim 1, further comprising a holder configured to fix one end of a tape to the groove when the one end of the tape is inserted into the groove.

4. The cell taping apparatus of claim 3, wherein the holder comprises tongs having two arms configured to grip the one end of the tape with elastic force.

5. The cell taping apparatus of claim 1, wherein the guide further comprises a second slot that is defined to pass downward from the upper end of the guide at a position corresponding to that at which a tab is disposed on a plurality of unit cells.

6. The cell taping apparatus of claim 5, wherein the second slot is defined at a front or a rear side of the guide.

7. A cell taping apparatus comprising:
   a plate provided with an accommodation space having a top surface;
   a guide which extends upward from the top surface of the plate to define the accommodation space therein and through which at least one pair of first slots are defined to pass downward from an upper end of the guide at opposing left and right sides of the guide; and
   a tape, which has a length equal to or greater than a width of the plate, of which opposing ends respectively pass through a pair of the at least one pair of first slots, and which is seated on the top surface of the plate so that an adhesion surface of the tape faces away from the top surface of the plate.

8. The cell taping apparatus of claim 7, further comprising a plurality of unit cells stacked on the adhesion surface of the tape.

9. The cell taping apparatus of claim 7, wherein the at least one pair of first slots includes a plurality of pairs of first slots.

10. The cell taping apparatus of claim 7, wherein the plate comprises a groove that is recessed inward at a position at which one of the ends of the tape is seated on the top surface of the plate.

11. The cell taping apparatus of claim 10, further comprising a holder that fixes the one of the ends of the tape to the groove when the one of the ends of the tape is inserted into the groove.

12. The cell taping apparatus of claim 7, wherein the plate comprises grooves that are recessed inward at positions at which both the ends of the tape, respectively, are seated on the top surface of the plate.

13. The cell taping apparatus of claim 12, further comprising holders that fix both the ends of the tape, respectively, to the respective groove when both the ends of the tape are inserted into the respective grooves.

14. The cell taping apparatus of claim 7, wherein the guide further comprises a second slot that is defined to pass downward from the upper end of the guide at a position corresponding to that at which a tab is disposed on a plurality of unit cells.

15. The cell taping apparatus of claim 14, wherein the second slot is defined at a front or a rear side of the guide.

16. A cell taping method comprising:
a step of allowing opposing ends of a tape to respectively pass through a pair of at least one pair of first slots formed in a guide which extends upward from a top surface of a plate and allowing an adhesion surface of the tape to be seated on the top surface of the plate while facing away from the top surface of the plate, the pair of the at least one pair of first slots passing downward from an upper end of the guide at opposing left and right sides of the guide,
the tape having a length equal to or greater than a width of the plate;
a step of stacking a plurality of unit cells on the adhesion surface of the tape to accommodate the plurality of unit cells in an accommodation space provided on the top surface of the plate; and
a step of moving both the ends of the tape to an upper side of the stack of unit cells so as to adhere to each other.

17. The cell taping method of claim 16, wherein, in the step of moving the both the ends of the tape to adhere to each other, the tape adheres also to side and top surfaces of the stack of unit cells.

18. The cell taping method of claim 16, wherein the plate comprises a groove that is recessed inward at a position at which one of the ends of the tape is seated on the top surface of the plate, and
the cell taping method further comprises, after the tape is seated on the top surface of the plate,
a step of inserting one of the ends of the tape into the groove; and
a step of allowing a holder to fix the one of the ends of the tape to the groove.

\* \* \* \* \*